(12) United States Patent
Uchino et al.

(10) Patent No.: US 8,646,572 B2
(45) Date of Patent: Feb. 11, 2014

(54) EXHAUST MUFFLER

(71) Applicant: Kawasaki Jukogyo Kabushiki Kaisha, Hyogo (JP)

(72) Inventors: Yoshihito Uchino, Kobe (JP); Kazuhisa Murao, Akashi (JP); Akira Soeda, Kobe (JP);

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 13/644,532

(22) Filed: Oct. 4, 2012

(65) Prior Publication Data

US 2013/0087405 A1 Apr. 11, 2013

(30) Foreign Application Priority Data

Oct. 6, 2011 (JP) ................................. 2011-221857

(51) Int. Cl.
*F01N 13/08* (2010.01)

(52) U.S. Cl.
USPC ............................ 181/228; 181/227; 181/212

(58) Field of Classification Search
USPC ........................ 181/228, 227, 212
See application file for complete search history.

(56) References Cited

U.S. PATENT DOCUMENTS

| 7,374,016 | B2* | 5/2008 | Yamaguchi et al. | 181/249 |
| 7,971,682 | B2* | 7/2011 | Inoue et al. | 181/269 |
| 8,127,887 | B2* | 3/2012 | Terashima et al. | 181/251 |
| 2001/0045322 | A1* | 11/2001 | Nilsson et al. | 181/227 |
| 2011/0127105 | A1* | 6/2011 | Lim et al. | 181/212 |
| 2012/0273299 | A1* | 11/2012 | Jones et al. | 181/228 |
| 2012/0273302 | A1* | 11/2012 | Takagaki et al. | 181/228 |
| 2012/0305330 | A1* | 12/2012 | Kainuma | 181/228 |

FOREIGN PATENT DOCUMENTS

JP 3020909 1/2000

* cited by examiner

*Primary Examiner* — Forrest M Phillips

(57) ABSTRACT

An exhaust muffler for silencing exhaust gases, introduced from a first side, and then discharging them to a second side opposite to the first side, includes a silencing chamber forming structure having first, second and third chambers disposed sequentially from the second side to the first side, an inlet tube to communicate the outside on the first side with the first chamber after having sequentially passed through the third and second chambers, an outlet tube to communicate the second chamber with the outside on the second side after having passed through the first chamber, a first communicating passage communicating between the first and second chambers, and a second communicating passage communicating between the second and third chambers. A peripheral wall portion of the inlet tube, positioned in the third chamber, is formed with a vent hole to communicate a space within the inlet tube with the third chamber.

14 Claims, 5 Drawing Sheets

EXHAUST MUFFLER

CROSS REFERENCE TO THE RELATED APPLICATION

This application is based on and claims Convention priority to Japanese patent application No. 2011-221857, filed Oct. 6, 2011, the entire disclosure of which is herein incorporated by reference as a part of this application.

BACKGROUND OF THE INVENTION

1. Field of the Invention

The present invention relates to an exhaust muffler for use in an automotive vehicle such as, for example, a motorcycle.

2. Description of Related Art

The exhaust muffler used in the currently commercially available automotive vehicle such as, for example, a motorcycle is known having an interior thereof divided by at least one partition wall member into a plurality of chambers, with exhaust gases flowing through those chambers. In particular, the Japanese Patent No. 3020909 discloses the exhaust muffler of a structure, in which those two partition wall members used to particular chambers are formed with first and second communicating passages, respectively, an outlet port of the first communicating passage being laid to confront an outlet port of the second communicating passage so that sound waves caused by exhaust gases flowing into those particular chambers can be bumped with each other within such particular chambers to thereby counteract the sound waves.

It has, however, been found that the exhaust muffler disclosed in the above mentioned patent fails to exhibit a sufficient exhaust silencing effect. In particular, at a high speed rotation at which the flow of the exhaust gases is high, the flow resistance is so high as to result in the reduction in engine output and, on the other hand, no sufficient silencing effect is available.

SUMMARY OF THE INVENTION

In view of the foregoing, the present invention is intended to provide an improved exhaust muffler of a type, in which not only at a low speed rotation and a medium speed rotation, but also at a high speed rotation at which the flow of the exhaust gases is high, a marked silencing effect can be obtained with no engine output being reduced.

In order to accomplish the foregoing object, the present invention provides an exhaust muffler for silencing exhaust gases, which have been introduced from a first side, and then discharging them to a second side opposite to the first side, which muffler includes a silencing chamber forming structure having first, second and third chambers disposed sequentially from the second side to the first side; an inlet tube having an inlet tube first end opening towards an outside of the silencing chamber forming structure and an inlet tube second end opening towards the first chamber after having sequentially passed through the third chamber and then through the second chamber as it extends from the inlet tube first end to the inlet tube second end; an outlet tube having an outlet tube first end opening towards the second chamber and an outlet tube second end opening to the outside of the silencing chamber forming structure after having passed through the first chamber as it extends from the outlet tube first end to the outlet tube second end; a first communicating passage communicating between the first chamber and the second chamber; and a second communicating passage communicating between the second chamber and the third chamber; and in which a peripheral wall portion of the inlet tube, which is positioned in the third chamber, is formed with a vent hole for communicating a space within the inlet tube with the third chamber.

According to the present invention, a major portion of the exhaust gases introduced from the inlet tube first end is introduced into the first chamber through the inlet tube second end after having flowed through the inlet tube in a direction lengthwise of such inlet tube. A portion of the exhaust gases introduced from the inlet tube first end is introduced into the third chamber. The vent hole in the tube peripheral wall is opened in a direction perpendicular to the tube lengthwise direction and, therefore, the exhaust gases introduced into the third chamber are smaller than the exhaust gases discharged into the first chamber. At a low speed rotation of the combustion engine the exhaust gases discharged from the vent hole is small and the pressure inside the inlet tube is low, and therefore, most of the exhaust gases are guided into the first chamber through such long inlet tube that extends a long distance through the third chamber and then through the second chamber to the first chamber. Hence, a high exhaust silencing effect can be obtained. Since the pressure inside the inlet tube becomes high at a high speed rotation of the combustion engine and the amount of the exhaust gases introduced into the third chamber increases, the undesirable reduction in engine output resulting from the increase of the resistance in the exhaust passage can be suppressed by preventing the substantial amount of the exhaust gases, which have flows through the inlet tube, from being clogged within the first chamber.

In a preferred embodiment of the present invention, the second communicating passage may be formed by a tube having an inlet end positioned within the third chamber, which inlet end is positioned on one side of the vent hole. According to this feature, at the time the exhaust gases introduced from the vent hole into the third chamber flow into the second chamber, the direction of flow of such exhaust gases need be altered towards an upstream side of the inlet tube with respect to the direction of flow of the exhaust gases. As a result, the exhaust silencing effect can be increased by increasing the path of movement of the exhaust gases through which the exhaust gases moves towards the second chamber by way of the third chamber.

In another preferred embodiment of the present invention, at least parts of respective outlet ends confronting the first communicating passage and the second communicating passage may be opposed to each other. According to this feature, the exhaust gases from the first chamber and the exhaust gases from the third chamber collide against each other with their energies consequently lost and, therefore, the exhaust silencing effect increases.

In a further preferred embodiment of the present invention, the inlet tube may include a vent hole forming portion, where the vent hole is formed, and may be provided with a rectifying structure on one side of the vent hole forming portion close to the inlet tube first end for rectifying the exhaust gases so as to flow in a tube lengthwise direction. According to this feature, since the exhaust gases so rectified are introduced into the vent hole forming portion, it is possible to prevent the exhaust gases, which is to be introduced from the vent hole into the third chamber, from becoming excessive. By way of example, if the rectifying structure is served by a honeycomb structure or a tube shaped catalyst, the number of component parts can be reduced.

In a still further preferred embodiment of the present invention, the inlet tube may include a vent hole forming portion, where the vent hole is formed, with a first transverse sectional area of the vent hole forming portion being set to be smaller than a second transverse sectional area of the inlet tube first end, in which case a portion on one side of one end portion remote from the vent hole forming portion and close to the inlet tube first end is formed with a constricted area for enhancing the flow velocity of the exhaust gases flowing in a tube lengthwise direction. According to this feature, by increasing the flow velocity of the exhaust gases, it is possible to prevent the exhaust gases, which will be introduced from the vent hole into the third chamber, from becoming excessive.

In a still further preferred embodiment of the present invention, the inlet tube may be arranged having been displaced relative to an axis extending from the first side towards the second side of a main body casing forming the silencing chamber forming structure, in which case a portion of the inlet tube excluding a confronting portion adjacent a main body casing is formed with the vent hole. According to this feature, the vigorous collision of the exhaust gases, discharged from the vent hole into the third chamber, against an adjacent portion adjacent the inlet tube within the main body casing can be prevented. Accordingly, the undesirable local temperature increase at that adjacent portion can be suppressed. Also, where an acoustic material, for example, is deposited on an inner surface of the main body casing, this acoustic material is prevented from being locally damaged, by the effect of thermal influences caused by the collision of the exhaust gases.

The present invention in accordance with another aspect thereof provides an automotive vehicle equipped with the exhaust muffler of the present invention, which exhaust muffler includes a tubular main body casing forming the exhaust silencing chamber forming structure and the inlet tube is held in close vicinity to one lateral portion of the main body casing confronting a vehicle body structure. According to this feature, the temperature outside the vehicle body structure become relatively lower than that inside the vehicle body structure and, therefore, undesirable thermal influences on the feet of a rider can be relieved.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Hereinafter, a preferred embodiment of the present invention will be described in detail with reference to the accompanying drawings. It is, however, to be noted that in describing the present invention the exhaust muffler, although applicable to any automotive vehicle that emits exhaust gases, is assumed as applied to a motorcycle.

Figure 1:
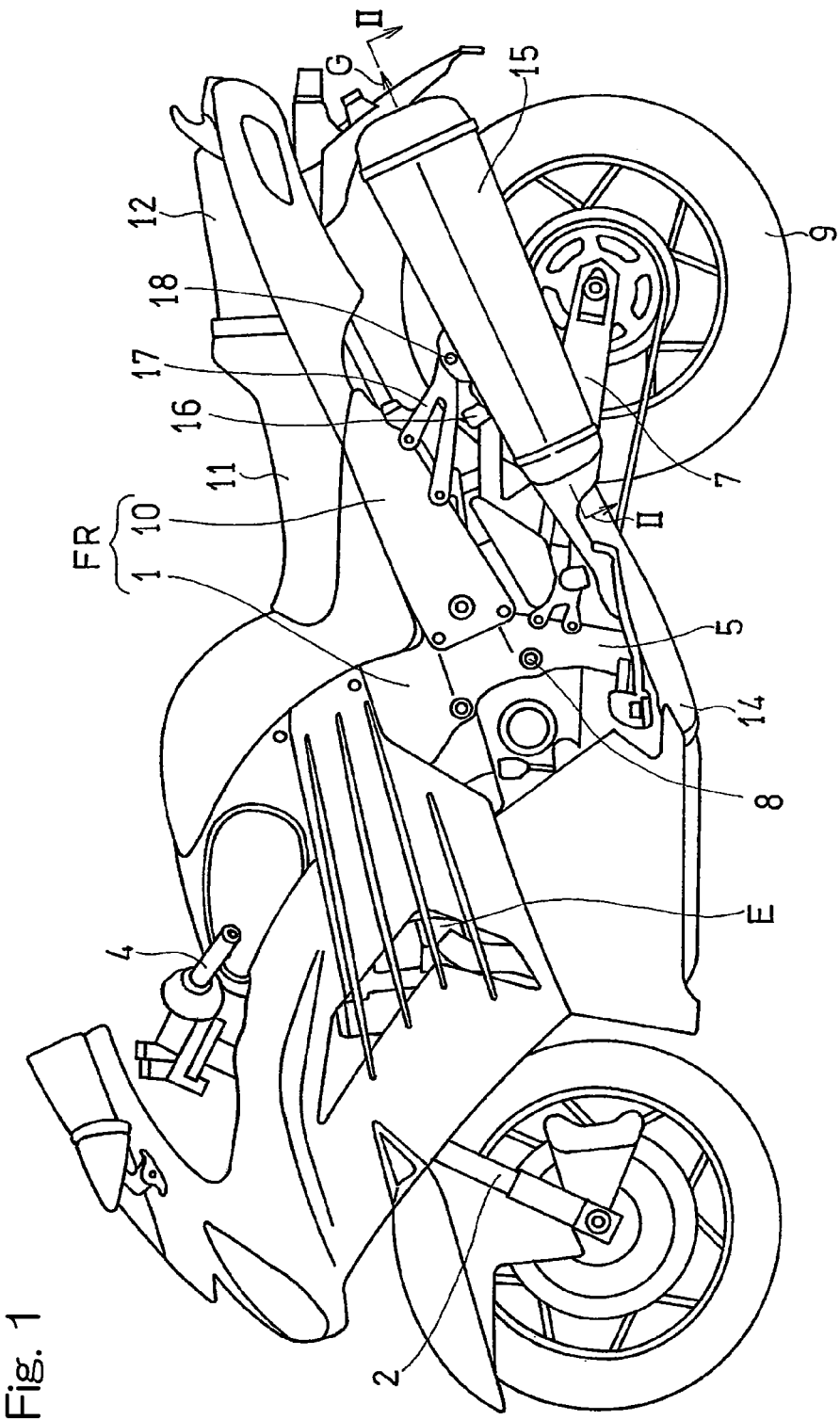
FIG. 1 is a side view showing a motorcycle equipped with an exhaust muffler designed in accordance with a preferred embodiment of the present invention.

The motorcycle shown in FIG. 1 includes a motorcycle frame structure FR having a front half thereof defined by a main frame 1 and also having a rear half thereof defined by a pair of left and right seat rails 10 connected rigidly with a rear portion of the main frame 1. The main frame 1 referred to above has its front end supporting a front fork assembly 2 with a front wheel 3 rotatably supported at a lower end of such front form assembly 2. The front fork assembly 2 has an upper end on which a handlebar 4 is mounted for angular movement together therewith. The main frame 1 has a rear lower portion formed with a swingarm bracket 5, and a swingarm 7 is coupled at its front end with the swingarm bracket 5 by means of a pivot pin 8 for movement up and down about such pivot pin 8. The swingarm 7 has a rear end rotatably supporting a rear wheel 9.

A multicylinder combustion engine E is mounted on an intermediate lower portion of the main frame 1 and positioned substantially or generally intermediate between the front wheel 3 and the rear wheel 9 so that the rear wheel 9 can be driven by the combustion engine E. A rider's seat 11 and a fellow passenger's seat 12 are mounted on front and rear portions of the seat rails 10, respectively.

On one side or both sides of the rear wheel 9 with respect to the direction of forward travel of the motorcycle, an exhaust muffler 15 fluidly connected with a rear end of a corresponding exhaust pipe 14 for the discharge of exhaust gases G from the combustion engine E towards the atmosphere is disposed. This exhaust muffler 15 is supported by the left or right seat rail 10 with a mounting member 18 such as, for example, a bolt fitted to a bracket 17 that is used to secure a left or right foot rest 16 for a fellow passenger, then occupying the fellow passenger's seat 12.

The exhaust muffler 15 so secured to the seat rail 10 in the manner described above represents a generally elongated tubular shape extending substantially parallel to the longitudinal axis of the motorcycle and in a direction longitudinally of a motorcycle body structure, when viewed from top, but extending rearwardly and diagonally upwardly when viewed from side. The details of the exhaust muffler 15 will now be described with particular reference to FIG. 2, showing a cross sectional view taken along the line II-II in FIG. 1, and FIG. 3 showing a longitudinal sectional view of such exhaust muffler 15.

Figure 2:
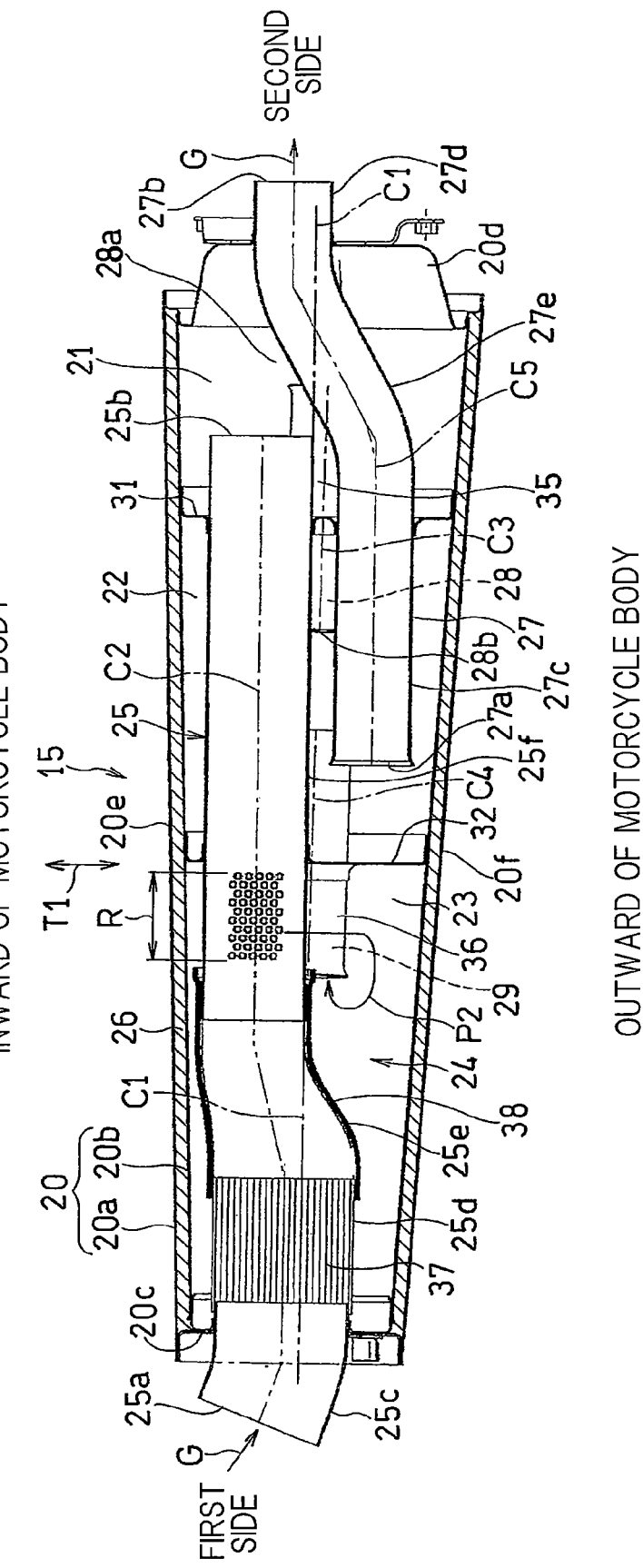
FIG. 2 is a cross sectional view taken along the line II-II in FIG. 1, showing the exhaust muffler on an enlarged scale.
Figure 3:
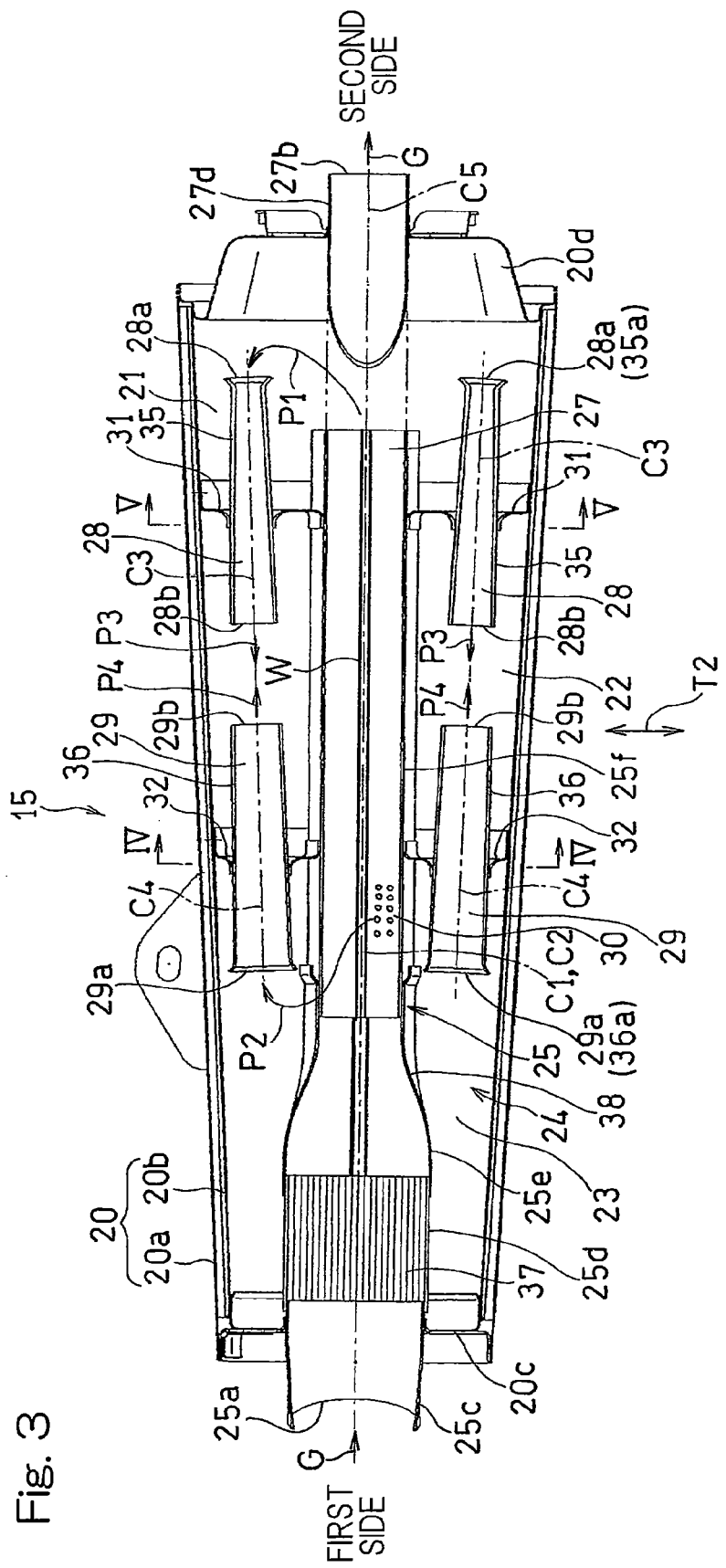
FIG. 3 is a longitudinal sectional view showing the exhaust muffler on a still further enlarged scale.

The exhaust muffler 15 best shown in FIG. 2 is an exhaust silencing device for silencing noses of the exhaust gases G, which have been introduced from a first side (a left side as viewed in FIG. 2), which is an upstream side with respect to the direction of flow of the exhaust gases G towards the atmosphere, and then discharging the silenced exhaust gases to a second side (a right side as viewed in FIG. 2) opposite to the first side, which is a downstream side with respect to the direction of flow of the exhaust gases G This exhaust muffler 15 includes a main body casing 20 having a silencing chamber forming structure 24, in which first to third chambers 21, 22 and 23 are disposed in this order from the second side towards the first side. The main body casing 20 is made up of an outer peripheral wall 20a, an inner peripheral wall 20b positioned radially inwardly of the outer peripheral wall 20a, a first end wall 20c on the first side and a second end wall 20d on the second side, with an acoustic material such as, for example, glass wool, filled in between the outer peripheral wall 20a and the inner peripheral wall 20. The inner peripheral wall 20b is prepared from a punched metal sheet formed with a multiplicity of small holes each extending completely across the wall thickness thereof.

The exhaust muffler 15 has an inlet tube 25 having an inlet passage defined therein and an outlet tube 27 having an outlet passage defined therein. The inlet tube 25 extends completely across the first end wall 20c with an inlet tube first end 25a opening towards the first side (a front end side) of the silencing chamber forming structure 24, and further extends sequentially through the third chamber 23 and then through the second chamber 22 as it goes from the inlet tube first end 25a towards an inlet tube second end 25b opposite to the inlet tube first end 25a, before the inlet tube second end 25b is left open to the first chamber 21. A portion of the inlet tube 25, which extends through the second chamber 22, is not formed with any radially extending throughhole. So far described, the main body casing 20 extends a substantial distance in a lengthwise direction consistent with the longitudinal axis C1 thereof and, therefore, the inlet tube 25 have a lengthy as large as possible to enhance an exhaust silencing effect during a low speed rotation of the combustion engine.

The outlet tube 27 has an outlet tube first end 27a left open towards the second chamber 22 and extends sequentially through the first chamber 21, as it extends from the outlet tube first end 27a towards an outlet tube second end 27b opposite to the outlet tube first end 27a, and further extends across the second end wall 20d with the outlet tube second end 27b left open towards the second side (rear end side) of the silencing chamber forming structure 24. A portion of the outlet tube 27, which extends through the first chamber 21, is not formed with any radially extending throughhole.

The silencing chamber forming structure 24 is divided into the first and second chambers 21 and 22 by a first partition wall 31 and is also divided into the second and third chambers 22 and 23 by a second partition wall 32. The first and second partition walls 31 and 32 have respective outer peripheral edge secured by, for example, welding, to the inner peripheral wall 20b.

The first and second chambers 21 and 22 are communicated with each other through a first communicating passage 28 and the second and third chambers 22 and 23 are communicated with each other through a second communicating passage 29. Also, a vent hole forming portion R of the inlet tube 25, which is a peripheral wall portion of the inlet tube 25 that is situated within the third chamber 23, is formed with a multiplicity of vent holes 30 communicating the interior of the inlet tube 25 with the third chamber 23. Through those vent holes 30 a portion of the exhaust gases G flowing within the inlet tube 25 is guided into the third chamber 23. Those vent holes 30 are so formed as to open in a direction radially of the inlet tube 25 and, therefore, as compared with the case in which they are so formed as to open slantwise in a direction radially outwardly with respect to the downstream direction of flow of the exhaust gases in the inlet tube, the amount of the exhaust gases introduced into the third chamber 23 can be suppressed.

The dimension of the third chamber 23 as measured in the lengthwise direction thereof, that is, in a direction conforming to the longitudinal axis C1 of the main body casing 20 is so chosen to be greater than that of any one of the first and second chambers 21 and 22. Accordingly, the exhaust gases G flowing into the third chamber 23 through the vent holes 30 has an ample latitude in flowing in the lengthwise direction and the amount of movement before they enters the second communicating passage 29 can be correspondingly increased to enhance the sound silencing effect.

It is to be noted that, although the plurality of the vent holes 30 have been shown and referred to, the number of the vent holes 30 may not be necessarily limited to those shown and described and at least one vent hole may suffice. In the illustrated embodiment, the plurality of the vent holes 30 are employed in a downstream area of that portion of the inlet tube 25 which portion runs into the third chamber 23, and those vent holes 30 are best shown in FIG. 2 as deployed in a substantially zigzag pattern in which one longitudinal row of the vent hole 30 is displaced relative to the next adjacent longitudinal row of the vent holes 30 a distance equal to half the spacing between the neighboring vent holes 30 of each longitudinal row. Particularly where each of the vent holes 30 is round, the diameter thereof is so chosen as to be smaller than the inner diameter of the inlet tube 25 as to avoid the possibility that the amount of the exhaust gases G introduced into the third chamber 23 through the vent holes 30 may become excessive.

Where only one vent hole 30 is employed, the diameter of the single vent hole employed is preferred to have a diameter smaller than 20 mm. Where the number of the vent holes 30 employed is plural, the diameter of each of those vent holes 30 decreases to an appropriate diameter preferred with the actually employed number thereof increasing, but in the illustrated embodiment each vent hole 30 is 3 mm in diameter. Also, each of the vent holes 30 is spaced from the next adjacent vent hole in a circumferential direction of the inlet tube 25 and also from the next adjacent vent hole in a direction consistent with the longitudinal axis C2 of the inlet tube 25 and, accordingly, as compared with the case in which only one large vent hole is formed, an undesirable reduction in strength of the inlet tube 25 can be suppressed.

The inlet tube 25 is made up of first to fourth inlet tube segments 25c to 25f that are connected in series with each other between the inlet tube first end 25a to the inlet tube second end 25b. Specifically, the first inlet tube segment 25c is prepared by bending a tubular member of a round sectional shape. A catalytic converter 37 is fluidly connected between the first inlet tube segment 25c and the third inlet tube segment 25e, and an outer peripheral wall of the catalytic converter 37 defines the second inlet tube segment 25d that is cylindrical and extends straight. The third inlet tube segment 25e that is bent is formed by integrally welding two components that correspond respectively to two equal parts of the third inlet tube segment 25e divided along the lengthwise direction thereof. The fourth inlet tube segment 25f, which is cylindrical and extends straight, is in the form of a seamless welded pipe prepared by rolling a steal plate with its lengthwise side edges at a joint W (FIGS. 3 and 4) welded together by means of a seamless welding (weld bead: 5 mm), followed by the formation of the vent holes 30 in an upstream portion thereof.

Since as hereinabove described, the vent hole forming portion R of the inlet tube 25 is of a shape similar to a straight tube, an exhaust speed component in a direction radially of the inlet tube 25, in which direction the vent holes 30 are left to open, is reduced as compared with the case of a curved tube and, therefore, it is possible to suppress an unexpected increase of the vent amount of the exhaust gases from the vent holes 30.

The catalytic converter 37 referred to above is used to substantially purify the exhaust gases G by oxidization and includes, for example, a ceramic honeycomb structure containing an oxidization catalyst carried thereby. As mentioned above, the outer peripheral wall of this catalytic converter 37 is used as the second inlet tube segment 25d. Accordingly, as compared with the case in which the catalytic converter is enclosed with a separate or extra tubular member, not only can the number of component parts used and the amount of material used be reduced, but also the catalytic converter 37 itself can be compactized to allow the third chamber 23 to be increased in capacity.

Referring to FIG. 3, the first communicating passage 28 is comprised of a first tube 35 supported by the first partition wall 31 and the second communicating passage 29 is comprised of a second tube 36 supported by the second partition wall 32. The first communicating passage 28 inside the first tube 35 has an inlet open end 28a, open in communication with the first chamber 21, and an outlet open end 28b, open in communication with the second chamber 22, and is provided in two in number and positioned one above the other with the inlet tube 25 intervening therebetween. Similarly, the second communicating passage 29 inside the second tube 36 has an inlet open end 29a, open in communication with the third chamber 23, and an outlet open end 29b, open in communication with the second chamber 22, and is provided in two in number and positioned one above the other with the inlet tube 25 intervening therebetween.

The first and second tubes 35 and 36 are supported while having been made to extend through the first and second partition walls 31 and 32, respectively. In order to reduce the flow resistance, the inlet open end 35a of the first tube 35 and the inlet open end 36a of the second tube 36 are flared, while having been smoothly curved, outwardly in the radial direction. The outlet tube first end 27a of the outlet tube 27 is of a similar shape.

A pair of the first communicating passages 28 and a pair of the second communicating passages 29 are so disposed as to be axially aligned with respective axes C3 and C4 of the corresponding communicating passages 28 and 29, such that the outlet open ends 28b of the first communicating passages 28 are axially opposed respectively to the outlet open ends 29b of the second communicating passages 29. Accordingly, the exhaust gases G emerging outwardly from the first and second communicating passages 28 and 29, respectively, are bumped with each other with their energies consequently lowered to facilitate the sound silencing effect. It is, however, to be noted that the first and second communicating passages 28 and 29 may not necessarily be in complete opposition to each other and at least portions thereof may be opposed to each other.

Also, the outlet tube first end 27a of the outlet tube 27 is displaced relative to the outlet open ends 28b and 29b of the first and second communicating passages 28 and 29 in a direction parallel to the longitudinal axis C1 of the main body casing 20 and, in the instance as shown, it is so disposed as to displace in a forward direction (the first side). Accordingly, after those portions of the exhaust gases G flowing outwardly from the outlet open ends 28b and 29b of the first and second communicating passages 28 and 29, respectively, have been sufficiently mixed together, they flow into the outlet tube 27 through a long path, and therefore, the sound silencing effect increases. In particular, since the outlet tube first end 27a of the outlet tube 27 is positioned at a location forwardly of the outlet open end 29b of the second communicating passage 29, the outlet tube 27 can have an increased length and, hence, the sound silencing effect is further increased.

The inlet open end 29a of the second communicating passage 29 is so set as to occupy a position adjacent the first side (left side as viewed in FIG. 2), which is a side upstream of the vent holes 30 best shown in FIG. 2. Accordingly, the exhaust gases emerging outwardly from the vent holes 30 and then entering the third chamber 23 flow into the inlet open end 29a after they have once deflected in a direction upstream of the inlet tube 25.

The catalytic converter 37 referred to previously is of the honeycomb structure having cells oriented in a direction conforming to the direction of flow of the exhaust gases G and, accordingly, the catalytic converter 37 concurrently serves to function as a rectifying structure for allowing the exhaust gases G to flow in a direction lengthwise of the inlet tube 25. This catalytic converter 37 may, however, be of a tubular structure and, even in this case, it can concurrently serves to exhibit a rectifying function. Since the catalytic converter 37 is disposed at a location upstream of the vent hole forming portion R in the inlet tube 25, not only can the entire amount of the exhaust gases G be purified substantially, but also the activity of the catalyst can be enhanced when it is caused to contact the exhaust gases G of an elevated temperature before the latter is lowered in temperature after the passage through the vent holes 30.

The inlet tube 25 is so set that the transverse sectional area (passage section) of the inlet tube first end 25a (left end as viewed in FIG. 2), which is on the upstream side, is smaller than the transverse sectional area (passage section) of the vent hole forming portion R, where the vent holes 30 are formed. The third inlet tube segment 25e adjacent one end of the vent hole forming portion R is formed with a constricted area 38 for increasing the flow velocity of the exhaust gases G in a direction lengthwise of the tube.

As best shown in FIG. 2, the inlet tube 25 is positioned close to a first lateral portion 20e, which is on one lateral side inwardly of the motorcycle body structure, of a peripheral wall of the main body casing 20 forming the silencing chamber forming structure 24. In other words, the inlet tube 25 is held at a position displaced so that the longitudinal axis C2 of the inlet tube 25 can assume a position inwardly of the motorcycle body structure relative to the longitudinal axis C1 of the main body casing 20. In contrast thereto, a front portion 27c, which is on an inlet side, of the outlet tube 27, is held at a position displaced towards a second lateral portion 20f of the main body casing 20 remote from the inlet tube 25. A rear portion 27d of the outlet tube 27 is held at a position substantially intermediate between the first lateral portion 20e and the second lateral portion 20f of the main body casing 20 and an area between the front portion 27c and the rear portion 27d is formed by a smoothly curved intermediate portion 27e. The outlet tube 27 in its entirety is, as FIG. 3 makes it clear, held at the same vertical position as the inlet tube 25 and, accordingly, when viewed from side, it overlaps the fourth tube segment 25f of the inlet tube 25.

If a first transverse direction (leftward and rightward direction of the motorcycle body structure) T1 passes through the first lateral portion 20e and the second lateral portion 20f of the main body casing 20, the first tube 35 and the second tube 36 are disposed in pairs on respective sides of the inlet tube 25 and the outlet tube 27 while spaced from each other in a second transverse direction T2 (up and down direction of the motorcycle body structure), which is shown FIG. 3 and lies perpendicular to the first transverse direction T1 and the longitudinal axis C1 of the main body casing 20.

Figure 4:
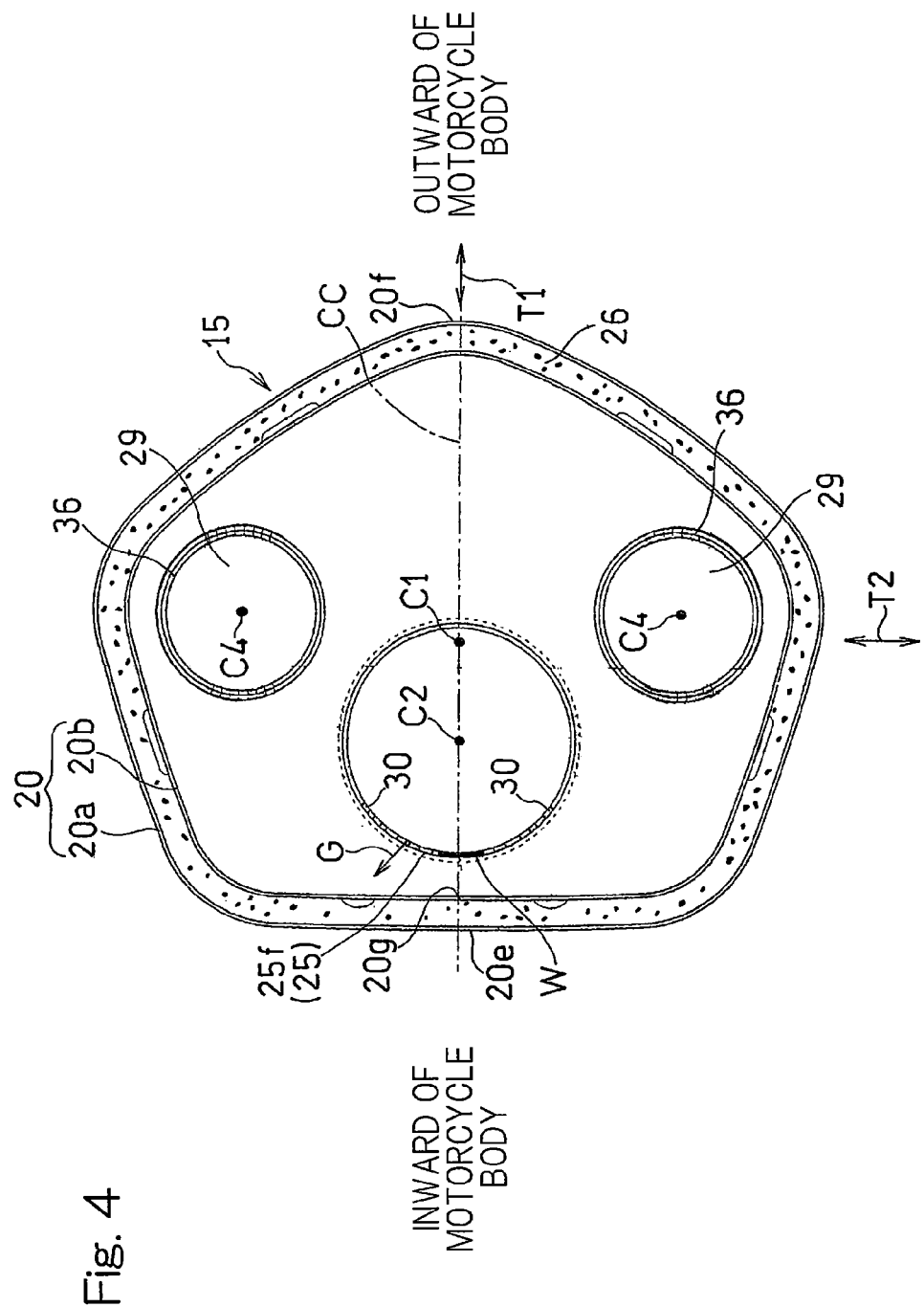
FIG. 4 is a cross sectional view taken along the line IV-IV in FIG. 3, but somewhat enlarged relative to that shown in FIG. 3.

The main body casing 20 is of a reverse-tapered or flared configuration gradually flaring in width from the first side towards the second side, that is, towards a lengthwise downstream side. Accordingly, while the lengthwise dimension of the first chamber 21 defined at a lengthwise downstream of the main body casing 20 is suppressed, the sound silencing effect can be enhanced with the capacity of the first chamber 21 increased. As shown in FIG. 4 showing a cross sectional view taken along the line IV-IV in FIG. 2, the main body casing 20 has a substantially pentagonal transverse sectional shape. Relative to the longitudinal axis C1 of the main body casing 20, the longitudinal axis C2 of the inlet tube 25 is displaced towards the casing first lateral portion 20*e* (left side portion as viewed in FIG. 4) that is in opposition to the motorcycle body structure as hereinbefore described and the second communicating passages 29 have respective longitudinal axes C4 each displaced towards the casing second lateral portion 20*f* (right side portion as viewed in FIG. 4) and positioned slantwise upwardly or downwardly of the inlet tube 25. The longitudinal axis C2 lies at the same level as the longitudinal axis C1 and on a center line CC of the pentagonal shape. This center line CC is aligned with the first transverse direction T1 passing through the first lateral portion 20*e* and the second lateral portion 20*f* of the main body casing 20. The vent holes 30 are formed at that portion of the fourth inlet tube segment 25*f* spaced from the seamless joint W where weld beads are formed, that is, a portion of the fourth inlet tube segment 25*f* excluding an opposite portion adjacent the main body casing 20.

Figure 5:
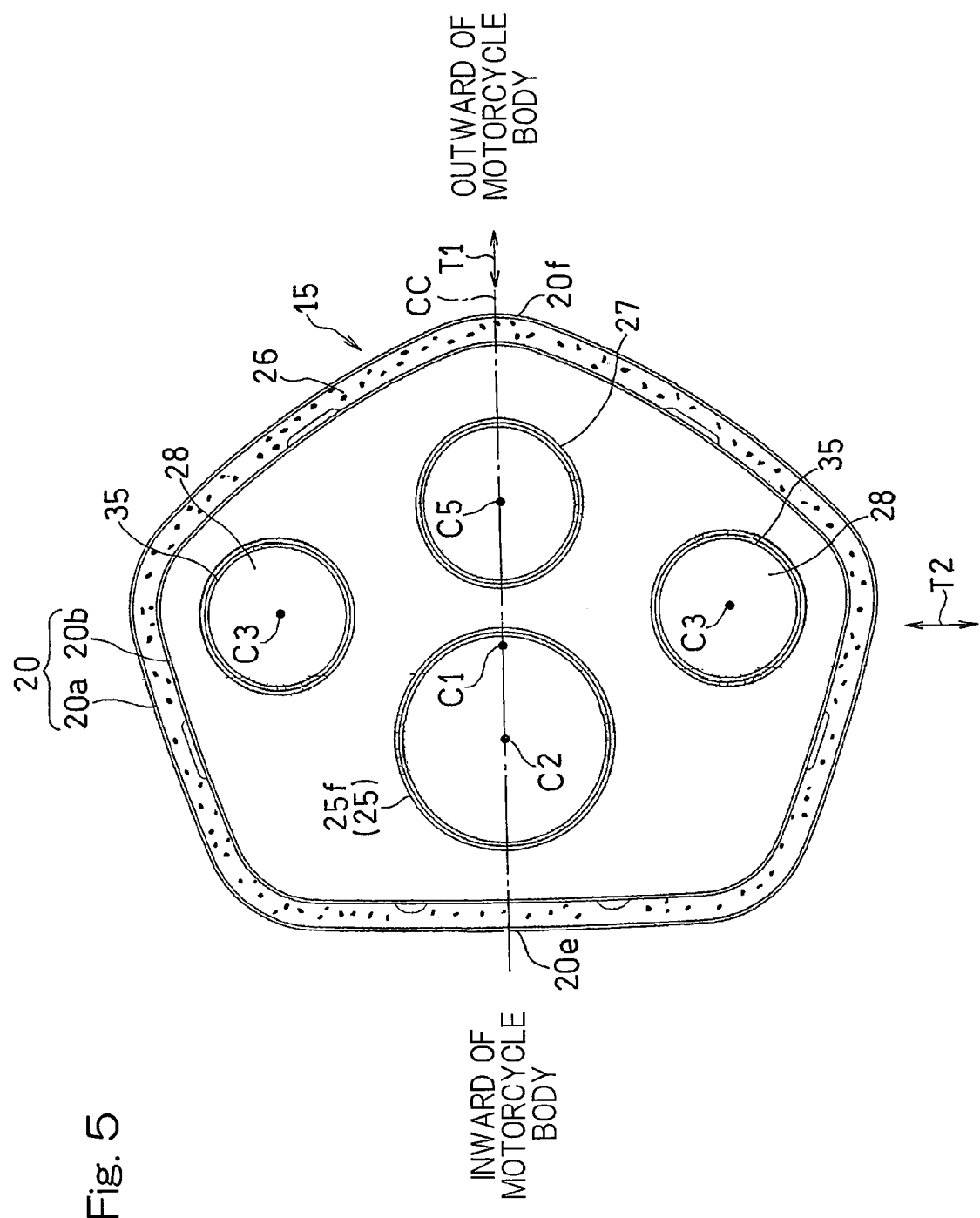
FIG. 5 is a cross sectional view taken along the line V-V in FIG. 3, but somewhat enlarged relative to that shown in FIG. 3.

As shown in FIG. 5 showing a cross sectional view taken along the line V-V in FIG. 2, relative to the longitudinal axis C1 of the main body casing 20, the first communicating passages 28 have respective longitudinal axes C3 each somewhat displaced towards the casing second lateral portion 20*f* and positioned slantwise upwardly or downwardly of the inlet tube 25. The outlet tube 27 has a longitudinal axis C5 displaced towards the casing second lateral portion 20*f* further away from the first communicating passage 28 and is held at the same level as the longitudinal axis C2 of the inlet tube 25. In other words, the longitudinal axis C5 lies on the center line CC of the pentagonal shape.

A rear portion of the outlet tube 27 extends through the second end wall 20*d* of the main body casing 20 and is then supported by such second end wall 20*d*. The longitudinal axis C5 of the outlet tube second end 27*b* of the outlet tube 27 is somewhat displaced relative to the longitudinal axis C1 of the main body casing 20 in a direction inwardly of the motorcycle body structure and lies on the center line CC of the pentagonal sectional shape.

As hereinabove described, the exhaust muffler 15 has its interior structure that is symmetrical up and down with respect to the longitudinal axis C1 as shown in FIG. 3 showing it as viewed from the first transverse direction T1. Accordingly, where this exhaust muffler 15 is to be disposed on left and right sides of the motorcycle body structure, it is possible to render the same structure as that of the exhaust muffler 15 to be used as the other exhaust muffler, when it is inverted upside down, and, accordingly, the number of components can be reduced.

Hereinafter, the function of the exhaust muffler 15 will be described. The exhaust gases G are introduced into the exhaust muffler 15 from the combustion engine E, best shown in FIG. 1, through the exhaust pipe 14. A major portion of the exhaust gases G introduced from the inlet tube first end 25*a* of the inlet tube 25 best shown in FIG. 2 flows within the inlet tube 25 in a direction lengthwise thereof and is then introduced from the inlet tube second end 25*b* into the first chamber 21. A portion of the exhaust gases G introduced from the inlet tube first end 25*a* of the inlet tube 25 is introduced into the third chamber 23 after having flows through the vent holes 30. Since the vent holes 30 in the tube peripheral wall are left open in a direction perpendicular to the tube lengthwise direction, the exhaust gases G introduced from the vent holes 30 into the third chamber 23 is smaller than the exhaust gases G introduced into the first chamber 21. The exhaust gases G introduced into the first chamber 21 flow through the first communication passage 28, as shown by the arrow P1, and is then introduced into the second chamber 22.

Since at a low speed rotation, the pressure inside the inlet tube 25 is low, the amount of the exhaust gases G introduced from the vent holes 30 into the third chamber 23 is small and a major portion of the exhaust gases G is introduced into the first chamber 21 through the inlet tube 25. At this time, since the inlet tube 25 extends a long distance through the third chamber 23 and the second chamber 22 to the first chamber 21, a high sound silencing effect can be obtained within the inlet tube 25. At a high speed rotation, the pressure inside the inlet tube 25 becomes high and the amount of the exhaust gases G introduced from the vent holes 30 into the third chamber 23 increases. Accordingly, a substantial amount of the exhaust gases G entering the first chamber 21 through the inlet tube 25 can be prevented from being clogged within the first chamber 21 to thereby suppress an undesirable reduction in engine output which would otherwise result from the increase of the resistance of the exhaust passage. By properly setting the length of the inlet tube 25, at a low rotation the first chamber 21 concurrently functions as a resonant chamber, and as a result, the sound silencing effect can be further increased.

Since the second communicating passage 29 has the inlet open end 29*a* defined by the first tube 35 positioned in the third chamber 23 and the inlet open end 29*a* is positioned on the first side of the vent holes 30, the exhaust gases G emerging outwardly from the vent hole 30 has its direction of flow deflected markedly towards an upstream side with respect to the direction of flow of the exhaust gases in the inlet tube 25 so as to flow into the second passage 29. As a result, the path of movement of the exhaust gases G become so long as to increase the sound silencing effect.

Also, since as shown in FIG. 3, the outlet open end 28*b* of the first communicating passage 28 and the outlet open end 29*b* of the second communicating passage 29 are held in face to face relation with each other, the exhaust gases G discharged from the outlet open end 28*b* of the first communicating passage 28 as shown by the arrows P3 and the exhaust gases G discharged from the outlet open end 29*b* of the second communicating passage 29 as shown by the arrows P4 collide against each other within the second chamber 22 and are discharged to the atmosphere through the outlet tube 27 after energies thereof have lost. Accordingly, the sound silencing effect increases.

Yet, since the exhaust gases G rectified by the catalytic converter 37 are guided towards the vent hole forming portion R, it is possible to prevent the exhaust gases G from being excessively discharged from the vent holes 30 in the inlet tube 25 to the third chamber 23. Moreover, since the catalytic converter 37 concurrently serves as a rectifying structure, the number of component parts can be reduced. As compared with a comparative case with no catalytic converter 37 employed, the embodiment employing the catalytic converter 37 has shown that the noise level during the acceleration is reduced by 0.5 dB.

Since the inlet tube 25 best shown in FIG. 2 is so designed that the transverse sectional area (passage area) of the vent hole forming portion R thereof, where the vent holes 30 are formed, is smaller than the transverse sectional area of the inlet tube first end 25a and that portion thereof adjacent the first side of the vent hole forming portion R is formed with the constricted area 38 where the flow velocity of the exhaust gases G then flowing in the direction lengthwise thereof can be increased, acceleration of the flow velocity of the exhaust gases G flowing through the vent hole forming portion R is effective to prevent the exhaust gases G from being excessively discharged from the inlet tube 25 to the third chamber 23.

As best shown in FIG. 2, relative to the longitudinal axis C1 of the main body casing 20 forming the silencing chamber forming structure 24, the longitudinal axis C2 of the inlet tube 25 is disposed having been displaced in the direction inwardly of the motorcycle body structure and a confronting site W, best shown in FIG. 4, of the inlet tube 25, which confronts the casing first lateral portion 20e positioned on one lateral side of the main body casing inwardly of the motorcycle body structure, approaches the main body casing 20. Since in this case the vent holes 30 are formed in that portion excluding the confronting site W, the exhaust gases G discharged from the vent holes 30 to the third chamber 23 are prevented from vigorously colliding against an adjacent portion 20g of the main body casing 20, which portion 20g is held closest to the first tube 35, and a local temperature increase of this adjacent portion 20g is suppressed. Also, where the acoustic material 26 is deposited on the inner surface of the main body casing 20, this acoustic material 26 can avoid a local damage resulting from thermal influences brought about by the collision of the exhaust gases G. In addition, since the confronting site W is a site of the weld joint as hereinbefore described, formation of the vent holes 30 in the portion excluding the site of the weld joint W is effective to avoid the reduction in strength of the inlet tube 25.

Further, since the inlet tube 25 is held in the close vicinity of the casing first lateral portion 20e of the main body casing 20, which confronts the motorcycle body structure as shown in FIG. 2, the temperature outside the motorcycle body structure becomes relatively lower than that inside the motorcycle body structure and, therefore, thermal influence, which may be imposed on the feet of the rider of the motorcycle, can be relieved.

In addition, since as FIG. 3 makes it clear, relative to the inlet tube 25 and the outlet tube 27, which are positioned adjacent the longitudinal axis C1 of the main body casing 20, the first tube 35 and the second tube 26 are disposed in pair on both sides thereof, the space within the main casing 20, that is, the space within the silencing chamber forming structure 24 can be efficiently utilized by arranging the various tubes 25, 27, 35 and 36 within the main body casing 20 in a balanced fashion.

The present invention can be equally applied to any exhaust muffler used not only in the motorcycle, but also in any automotive vehicle such as, for example, a four wheeled buggy or an off-road vehicle, of a kind having a combustion engine, which is an internal combustion engine, mounted thereon. The exhaust muffler of the present invention is suitably employed in a motorcycle of a kind in which the combustion engine undergoes a high speed rotation. Also, although in the foregoing preferred embodiment, the exhaust muffler 15 shown in FIG. 1 has been shown and described as positioned on each side of the rear wheel 9, the present invention is not necessarily limited thereto and is equally applicable to the use of the exhaust muffler disposed on one side of the rear wheel 9, disposed above the rear wheel 9, disposed below the combustion engine E or disposed between the combustion engine E and the rear wheel 9.

In addition, although in describing the preferred embodiment, the main body casing 20 of the exhaust muffler 15 best shown in FIG. 2 has been shown and described as extending in the rearward direction from the first end wall 20c, which is an upstream end portion, to the second end wall 20d, which is a downstream end portion, the present invention is not necessarily limited thereto. For example, where the exhaust muffler is disposed below the combustion engine, the main body casing 20 may be extend from the upstream end portion to the downstream end portion in a direction widthwise of the motorcycle body structure. Also, any other chamber may intervene between the first chamber 21 to the third chamber 23.

Yet, where a plurality of separate exhaust mufflers are employed, the present invention may be applied to at least one of those exhaust mufflers. By way of example, particularly where a first exhaust muffler is disposed forwardly of a front end portion of the rear wheel 9 shown in FIG. 1 and a second exhaust muffler is disposed rearwardly of the first exhaust muffler, the present invention may be applied to either one of the first and second exhaust mufflers. Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

15: Exhaust muffler
20: Main body casing
20a: Outer peripheral wall
20b: Timer peripheral wall
21: First chamber
22: Second chamber
23: Third chamber
24: Silencing chamber forming structure
25: Inlet tube
25a: Inlet tube first end
25b: Inlet tube second end
26: Acoustic material
27: Outlet tube
27a: Outlet tube first end
27b: Outlet tube second end
28: First communicating passage
29: Second communicating passage
30: Vent holes
31: First partition wall
32: Second partition wall
35: First tube
36: Second tube
37: Catalytic converter (Rectifying structure)
38: Constricted area
C1 to C5: Longitudinal axis
G: Exhaust gases
R: Vent hole forming portion

What is claimed is:

1. An exhaust muffler for silencing exhaust gases, which have been introduced from a first side, and then discharging them to a second side opposite to the first side, which muffler comprises:
   a silencing chamber forming structure having first, second and third chambers disposed sequentially from the second side to the first side;
   an inlet tube having an inlet tube first end opening towards an outside of the silencing chamber forming structure and an inlet tube second end opening towards the first chamber after having sequentially passed through the third chamber and then through the second chamber as it extends from the inlet tube first end to the inlet tube second end;
   an outlet tube having an outlet tube first end opening towards the second chamber and an outlet tube second end opening to the outside of the silencing chamber forming structure after having passed through the first chamber as it extends from the outlet tube first end to the outlet tube second end;
   a first communicating passage communicating between the first chamber and the second chamber; and
   a second communicating passage communicating between the second chamber and the third chamber;
   in which a peripheral wall portion of the inlet tube, which is positioned in the third chamber, is formed with a vent hole for communicating a space within the inlet tube with the third chamber, and
   in which the exhaust gases passing through the first communicating passage are guided into the second chamber from the first side, and the exhaust gases passing through the second communicating passage are guided into the second chamber from the second side that is opposite to the first side to collide the respective exhaust gases from the first and second communicating passage.

2. The exhaust muffler as claimed in claim 1, in which the second communicating passage is formed by a tube having an inlet end positioned within the third chamber, which inlet end is positioned on one side of the vent hole, and
   in which the exhaust gases emerging outwardly from the vent hole has its direction of flow deflected towards an upstream side with respect to the direction of flow of the exhaust gases in the inlet tube so as to flow into the second passage.

3. The exhaust muffler as claimed in claim 1, in which at least parts of respective outlet ends confronting the first communicating passage and the second communicating passage are opposed to each other in an axial direction thereof.

4. The exhaust muffler as claimed in claim 1, in which the inlet tube includes a vent hole forming portion, where the vent hole is formed, and is provided with a rectifying structure on one side of the vent hole forming portion close to the inlet tube first end for rectifying the exhaust gases so as to flow in a tube lengthwise direction.

5. The exhaust muffler as claimed in claim 1, in which the inlet tube includes a vent hole forming portion, where the vent hole is formed, with a first transverse sectional area of the vent hole forming portion being set to be smaller than a second transverse sectional area of the inlet tube first end, and
   in which a portion on one side of one end portion remote from the vent hole forming portion and close to the inlet tube first end is formed with a constricted area for enhancing the flow velocity of the exhaust gases flowing in a tube lengthwise direction.

6. The exhaust muffler as claimed in claim 1, in which the inlet tube is arranged having been displaced relative to an axis extending from the first side towards the second side of a main body casing forming the silencing chamber forming structure, and
   in which a portion of the inlet tube excluding a confronting portion adjacent a main body casing is formed with the vent hole.

7. An automotive vehicle equipped with an exhaust muffler as defined in claim 1, which exhaust muffler comprises a tubular main body casing forming the exhaust silencing chamber forming structure and the inlet tube is held in close vicinity to one lateral portion of the main body casing confronting a vehicle body structure.

8. The exhaust muffler as claimed in claim 3, in which the first communicating passage and the second communicating passage are so disposed as to be axially aligned with each other, such that the outlet end of the first communicating passage is axially opposed to the outlet end of the second communicating passage.

9. The exhaust muffler as claimed in claim 4, further comprising a catalytic converter provided in the inlet pipe to purify the exhaust gases, catalytic converter serving to function as the rectifying structure.

10. The exhaust muffler as claimed in claim 1, in which the inlet tube has a confronting site which approaches a main body casing, and the vent holes are formed in a portion excluding the confronting site.

11. The exhaust muffler as claimed in claim 1, in which the inlet tube includes an inlet tube segment, which is cylindrical and extends straight, in the form of a seamless welded pipe with its lengthwise side edges at a joint welded together, and the vent holes are formed in a portion excluding the joint welded.

12. The exhaust muffler as claimed in claim 1, in which the first communicating passage is provided in two in number and positioned separately with the inlet pipe intervening therebetween, and the second communicating passage is provided in two in number and positioned separately with the inlet pipe intervening therebetween.

13. An exhaust muffler for silencing exhaust gases, which have been introduced from a first side, and then discharging them to a second side opposite to the first side, which muffler comprises:
   a muffler body casing;
   a silencing chamber forming structure having first, second and third chambers disposed sequentially from the second side to the first side within the muffler body casing;
   an inlet tube having an inlet tube first end opening towards an outside of the silencing chamber forming structure and an inlet tube second end opening towards the first chamber after having sequentially passed through the third chamber and then through the second chamber as it extends from the inlet tube first end to the inlet tube second end;
   a catalytic converter provided in the inlet tube to purify the exhaust gases, the catalytic converter also serving to function as a rectifying structure for the exhaust gases;
   an outlet tube having an outlet tube first end opening towards the second chamber and an outlet tube second end opening to the outside of the silencing chamber forming structure after having passed through the first chamber as it extends from an outlet tube first end to an outlet tube second end;
   a first communicating passage communicating between the first chamber and the second chamber; and
   a second communicating passage communicating between the second chamber and the third chamber;

wherein a peripheral wall portion of the inlet tube, which is positioned in the third chamber, is formed with a plurality of vent holes for communicating a portion of the exhaust gases within the inlet tube to the third chamber and the remainder of the exhaust gases enter the first chamber;

the first communicating passage and the second communicating passage are so disposed as to be aligned with each other, such that the outlet end of the first communicating passage is opposed to the outlet end of the second communicating passage wherein the exhaust gases passing through the first communicating passage and the second communicating passage impact and mix before leaving through the outlet tube.

14. The exhaust muffler as claimed in claim 13 wherein the main body casing has a transverse cross sectional pentagonal shape.

* * * * *